(12) United States Patent
Semary

(10) Patent No.: US 11,945,921 B1
(45) Date of Patent: Apr. 2, 2024

(54) BIOCOMPOSITE OF ALGAE

(71) Applicant: KING FAISAL UNIVERSITY, Al-Ahsa (SA)

(72) Inventor: Nermin Adel El Semary, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/218,358

(22) Filed: Jul. 5, 2023

Related U.S. Application Data

(62) Division of application No. 18/116,647, filed on Mar. 2, 2023.

(51) Int. Cl.
*C08J 5/00* (2006.01)
*C08J 5/04* (2006.01)
*C08L 71/02* (2006.01)

(52) U.S. Cl.
CPC .............. *C08J 5/045* (2013.01); *C08L 71/02* (2013.01); *C08J 2300/16* (2013.01); *C08J 2471/02* (2013.01)

(58) Field of Classification Search
None
See application file for complete search history.

(56) References Cited

U.S. PATENT DOCUMENTS

| | | | |
|---|---|---|---|
| 10,039,238 B2 | 8/2018 | Samet | |
| 2013/0220173 A1* | 8/2013 | Sharma | C08L 89/00 523/447 |
| 2016/0174469 A1* | 6/2016 | Shaffer | A01G 9/0291 47/65.5 |
| 2019/0053999 A1* | 2/2019 | Hori | A61Q 19/00 |

FOREIGN PATENT DOCUMENTS

| | | | | |
|---|---|---|---|---|
| CN | 104305180 A | * | 1/2015 | .............. A23L 2/00 |
| CN | 113549236 A | * | 10/2021 | |
| EP | 3560988 A1 | * | 10/2019 | .............. A23B 4/10 |
| WO | 2021220283 A1 | | 11/2021 | |

OTHER PUBLICATIONS

CN-104305180-A, English translation (Year: 2015).*
CN-113549236-A, English translation (Year: 2021).*

* cited by examiner

*Primary Examiner* — Stefanie J Cohen
(74) *Attorney, Agent, or Firm* — Nath, Goldberg & Meyer; Richard C. Litman

(57) ABSTRACT

A biocomposite of algae and a plant material is provided. The biocomposite of algae comprises glycerol and a plant material including at least one of *Abelmoschus esculentus* (Okra), and *Lepidium sativum* (Cress). The biocomposite may optionally include a plasticizer. The algae may be green marine algae (*Codium* sp). The biocomposite is biodegradable and moldable into any suitable shape. Thus, the biocomposite may be used to form containers, such as for potting plants or seedlings, as a mulching or fertilizing material, or for any applications where a moldable, biodegradable material is desired.

15 Claims, No Drawings

BIOCOMPOSITE OF ALGAE

CROSS-REFERENCE TO RELATED APPLICATION

This application is a divisional of U.S. patent application Ser. No. 18/116,647, filed on Mar. 2, 2023.

BACKGROUND

1. Field

The disclosure of the present patent application relates to making inexpensive, eco-friendly, biodegradable materials, and particularly to a biocomposite of algae.

2. Description of the Related Art

In general, inexpensive materials and, particularly, containers used to grow plants are made from plastics. Plastic is inexpensive but can leach undesirable (and potentially harmful) chemicals into the soil. In addition, plastic consumes nonrenewable resources and generally is not biodegradable.

Thus, a biocomposite of algae for making inexpensive, eco-friendly, biodegradable materials solving the aforementioned problems is desired.

SUMMARY

The biocomposite of algae relates to a biocomposite including a mixture of a marine algae and a plant material. The plant material can include at least one of *Abelmoschus esculentus* (Okra) and *Lepidium sativum* (Cress). In some embodiments, the biocomposite may include glycerol. In some embodiments, the biocomposite may optionally include a plasticizer. In some embodiments, the marine algae may be green marine algae (*Codium* sp). The biocomposite may be used to form containers, such as for potting plants or seedlings, as a mulching or fertilizing material, or for any applications where a moldable, biodegradable material is desired.

In an embodiment, the biocomposite of algae may be produced by mixing green marine algae (*Codium* sp) with a plant material including *Abelmoschus esculentus* (Okra), *Lepidium sativum* (Cress), or a combination thereof. The mixed plant materials may then be homogenized with a mortal and pestle, mixed with water and glycerol, and pressure cooked. Optionally, a plasticizer may be added before pressure cooking. The pressure-cooked material may then be molded into any desirable form and allowed to cool. The resulting biocomposite material is biodegradable and may be used both as a container and as a fertilizer, as degradation of the biocomposite material will return nutrients to the soil.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a biocomposite including marine algae and a plant material. The plant material can include at least one of *Abelmoschus esculentus* (Okra) and *Lepidium sativum* (Cress). In some embodiments, the biocomposite may include glycerol. In some embodiments, the biocomposite may optionally include a plasticizer. In some embodiments, the marine algae may be green marine algae (*Codium* sp). The biocomposite may be used to form containers, such as for potting plants or seedlings, as a mulching or fertilizing material, or for any applications where a moldable, biodegradable material is desired.

In some embodiments, the algae and plant material (algae and okra, cress, or a combination of okra and cress) to glycerol ratio (w/w) may be about 3:1, about 4:1, about 5:1, or any ratio falling between 3:1 and 5:1.

The plasticizer may be any plasticizer suitable for use in a biodegradable composition. In some embodiments, the plasticizer may be polyethylene glycol (PEG) 4000. In some embodiments, the algae and plant material (algae and okra, cress, or a combination of okra and cress) to plasticizer ratio (w/w) may be about 25:1, about 30:1, about 35:1, or any ratio falling between 25:1 and 35:1.

In an embodiment, the biocomposite of algae may be produced by mixing green marine algae (*Codium* sp) with plant material including *Abelmoschus esculentus* (Okra), *Lepidium sativum* (Cress), or a combination thereof. The algae and plant material may then be homogenized with a mortal and pestle, mixed with water and glycerol, and pressure cooked. Optionally, a plasticizer may be added before pressure cooking. The pressure-cooked material may then be molded into any desirable form and allowed to cool. The resulting biocomposite material is biodegradable and may be used both as a container and as a fertilizer, as degradation of the biocomposite material will return nutrients to the soil.

In some embodiments, the biocomposite material may include an equal volume of green marine algae and a plant material selected from Okra and Cress. In further embodiments, the plant material may include an equal volume of marine algae and a plant material including both Okra and Cress.

In some embodiments, the amount of glycerol added may be sufficient to ensure that the algae and plant material mixture to glycerol ratio (w/w) is about 3:1, about 4:1, about 5:1, or any ratio falling between 3:1 and 5:1.

The plasticizer may be any plasticizer suitable for use in a biodegradable composition. In some embodiments, the plasticizer may be polyethylene glycol (PEG) 4000. In some embodiments, the amount of plasticizer added may be sufficient to ensure that algae and plant material mixture to plasticizer ratio (w/w) is about 25:1, about 30:1, about 35:1, or any ratio falling between 25:1 and 35:1.

In some embodiments, the pressure cooking may occur at a high combined pressure and temperature. By way of example, the pressure cooking may occur at a temperature of about 115° C., about 120° C., about 125° C., or any temperature between 115° C. and 125° C. and at a pressure of about 1.4 atmospheric pressure, about 1.5 atmospheric pressure, about 1.6 atmospheric pressure, or at any pressure between 1.4 atmospheric pressure and 1.6 atmospheric pressure. In some embodiments, the pressure cooking may occur at about 121° C. and about 1.5 atmospheric pressure for about 20 minutes. The skilled artisan will readily understand that by increasing any one of these variables the others may be reduced, and this method further encompasses all such variations.

The present subject matter may be better understood in view of the following example.

Example 1

Making the Biocomposites with Algae

Okra (*Abelmoschus esculentus* 10 g fresh weight) was mixed with green marine algae (*Codium* sp. 10 g fresh weight) and completely homogenized with a mortar and pestle. The homogenized mixture was then mixed with 75 ml water, 1.5 g PEG 4,000 (dry matter), and 10 ml glycerol (50:50 v:v) to produce a solution. The solution was pressure-cooked at 121° C. and 1.5 atmospheric pressure for 20 minutes and cooled to form the biocomposite with algae.

Cress seeds (*Lepidium sativum* 10 g fresh weight ground seeds) were mixed with green marine algae (*Codium* sp. 10 g fresh weight) and completely homogenized with a mortar and pestle. The homogenized mixture was then mixed with 75 ml water, 1.5 g PEG 4,000 (dry matter), and 10 ml glycerol (50%, 500 mg/ml) to produce a solution. The solution was pressure-cooked at 121° C. and 1.5 atmospheric pressure for 20 minutes and cooled to form the biocomposite with algae.

Cress seeds (*Lepidium sativum* 5 g fresh weight ground seeds), Okra (*Abelmoschus esculentus* 5 g fresh weight), and green marine algae (*Codium* sp. 10 g fresh weight) were mixed together and completely homogenized with a mortar and pestle. The homogenized mixture was then mixed with 75 ml water, 1.5 g PEG 4,000 (dry matter), and 10 ml glycerol (50:50 v:v) to produce a solution. The solution was pressure-cooked at 121° C. and 1.5 atmospheric pressure for 20 minutes and cooled to form the biocomposite with algae.

It is to be understood that the biocomposite of algae is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of making a container from a biodegradable biocomposite, comprising:
   (a) mixing marine algae with a plant material to provide a mixture;
   (b) homogenizing the mixture;
   (c) adding water and glycerol to the mixture to form a solution;
   (d) pressure-cooking the solution to form the biodegradable biocomposite; and
   (e) forming the container from the biodegradable composite;
   wherein the biodegradable biocomposite is moldable to form a container having a desired shape.

2. The method of claim 1, further comprising casting the biodegradable biocomposite in a mold.

3. The method of claim 1, wherein the marine algae comprises a species of *Codium*.

4. The method of claim 1, wherein the plant material comprises material from a plant selected from the group consisting of *Abelmoschus esculentus, Lepidium sativum*, and a combination thereof.

5. The method of claim 1, wherein the plant material comprises material from *Abelmoschus esculentus*.

6. The method of claim 1, wherein the plant material comprises material from *Lepidium sativum*.

7. The method of claim 1, wherein the plant material comprises a mixture of material from *Abelmoschus esculentus* and material from *Lepidium sativum*.

8. The method of claim 1, further comprising adding a plasticizer to the solution.

9. A method of making a mulching or fertilizing material from a biodegradable biocomposite, comprising:
   (a) mixing marine algae with a plant material to provide a mixture;
   (b) homogenizing the mixture;
   (c) adding water and glycerol to the mixture to form a solution;
   (d) pressure-cooking the solution to form the biodegradable biocomposite; and
   (e) forming the mulching or fertilizing material from the biodegradable composite.

10. The method of claim 9, wherein the marine algae comprises a species of *Codium*.

11. The method of claim 9, wherein the plant material comprises material from a plant selected from the group consisting of *Abelmoschus esculentus, Lepidium sativum*, and a combination thereof.

12. The method of claim 9, wherein the plant material comprises material from *Abelmoschus esculentus*.

13. The method of claim 9, wherein the plant material comprises material from *Lepidium sativum*.

14. The method of claim 9, wherein the plant material comprises a mixture of material from *Abelmoschus esculentus* and material from *Lepidium sativum*.

15. The method of claim 9, further comprising adding a plasticizer to the solution.

\* \* \* \* \*